US007407719B1

(12) United States Patent
Girt et al.

(10) Patent No.: US 7,407,719 B1
(45) Date of Patent: Aug. 5, 2008

(54) LONGITUDINAL MAGNETIC MEDIA HAVING A GRANULAR MAGNETIC LAYER

(75) Inventors: Erol Girt, San Jose, CA (US); Li-Lien Lee, San Jose, CA (US); Samuel D. Harkness, IV, Berkeley, CA (US)

(73) Assignee: Seagate Technology LLC, Scotts Valley, CA (US)

( * ) Notice: Subject to any disclaimer, the term of this patent is extended or adjusted under 35 U.S.C. 154(b) by 285 days.

(21) Appl. No.: 10/829,164

(22) Filed: Apr. 22, 2004

Related U.S. Application Data

(60) Provisional application No. 60/531,986, filed on Dec. 24, 2003.

(51) Int. Cl.
*G11B 5/66* (2006.01)
(52) U.S. Cl. .................................... 428/828; 428/831.2
(58) Field of Classification Search ................. 428/828, 428/831, 831.2
See application file for complete search history.

(56) References Cited

U.S. PATENT DOCUMENTS

| 5,679,473 | A | 10/1997 | Murayama et al. |
| 5,928,750 | A | 7/1999 | Gao et al. |
| 6,548,139 | B2 | 4/2003 | Sakai et al. |
| 6,723,450 | B2 * | 4/2004 | Do et al. ..................... 428/828 |
| 6,759,149 | B1 * | 7/2004 | Chen et al. ................... 428/828 |
| 6,858,331 | B1 * | 2/2005 | Bian et al. ................ 428/832.2 |
| 2002/0048694 | A1 | 4/2002 | Mukai et al. |
| 2002/0114975 | A1 | 8/2002 | Oikawa et al. |
| 2002/0136926 | A1 | 9/2002 | Oikawa et al. |
| 2003/0044649 | A1 | 3/2003 | Takizawa et al. |
| 2003/0087131 | A1 | 5/2003 | Oikawa et al. |
| 2003/0138671 | A1 * | 7/2003 | Oikawa et al. .............. 428/695 |
| 2003/0215675 | A1 | 11/2003 | Inaba et al. |

OTHER PUBLICATIONS

*Digests of PMRC2000*, 141 (2000), T. Shimatsu, H. Uwazumi, H. Muraoka, and Y. Nakamura.

* cited by examiner

*Primary Examiner*—Holly Rickman
(74) *Attorney, Agent, or Firm*—Darby & Darby PC

(57) ABSTRACT

A novel method of manufacturing a longitudinal granular oxide recording medium is disclosed. The method preferably entails obtaining a non-magnetic substrate, heating the substrate at a temperature $T_1$ that is greater than 150° C., forming a first layer with body-centered cubic atomic structure and with a <200> preferred growth orientation, cooling the substrate to a temperature $T_2$ and forming a second layer comprising a magnetic oxide-containing granular magnetic layer with a hexagonal close packed atomic structure and with a <11-20> preferred growth orientation. The magnetic oxide-containing granular magnetic layer contains magnetic crystal grains that are substantially isolated by an inter-granular region comprising a non-magnetic substance, wherein the non-magnetic substance is preferably an oxide-containing material.

7 Claims, 4 Drawing Sheets

Major differences: Granular longitudinal oxide media (GLOM) and alloy media

1) Head media separation
improved 4.3 nm due to higher $M_s$

2) Improved segregation
$\sigma_{HA}/H_A$ reduced from 0.11 to 0.04

Alloy media | Granular longitudinal oxide media (GLOM)

Grain boundaries

Major differences: Granular longitudinal oxide media (GLOM) and alloy media

1) Head media separation improved 4.3 nm due to higher $M_s$

2) Improved segregation $\sigma_{H_A}/H_A$ reduced from 0.11 to 0.04

LONGITUDINAL MAGNETIC MEDIA HAVING A GRANULAR MAGNETIC LAYER

RELATED APPLICATIONS

This application claims benefit from Provisional Application Ser. No. 60/531,986, filed Dec. 24, 2003, the entire disclosure of the above mentioned application is hereby incorporated herein by reference.

FIELD OF INVENTION

The present invention relates to the recording, storage and reading of magnetic data in a longitudinal magnetic media having a granular magnetic layer, particularly to a process for fabricating longitudinal granular oxide media.

BACKGROUND

In a magnetic media, digital information (expressed as combinations of "0's" and "1's") is written on tiny magnetic bits (which themselves are made up of many even smaller grains). When a bit is written, a magnetic field produced by the disc drive's head orients the bit's magnetization in a particular direction, corresponding to either a 0 or 1. The magnetism in the head in essence "flips" the magnetization in the bit between two stable orientations.

The increasing demands for higher areal recording density impose increasingly greater demands on thin film magnetic recording media in terms of remanent coercivity (Hr), magnetic remanance (Mr), coercivity squareness (S*), signal-to-medium noise ratio (SMNR), and thermal stability of the media. In particular, as the SMNR is reduced by decreasing the grain size or reducing exchange coupling between grains, it has been observed that the thermal stability of the media decreases. Thus, various compositions and structures of a magnetic layer, materials for a nonmagnetic base layer, and the like have been proposed including the use of a "granular magnetic layer." A "granular magnetic layer" is a magnetic layer in which a nonmagnetic substance that is preferably nonmetallic, such as an oxide or nitride, surrounds a periphery of ferromagnetic crystal grains. A possible explanation for the reduction in noise in a granular magnetic layer could be due to an improved separation between magnetic grains by the nonmagnetic, nonmetallic grain-boundary phase that physically separates the magnetic grains from one another to weaken a magnetic interaction among the magnetic grains, thereby hindering zigzag magnetic domain walls from being formed in recording-bit transition regions.

The ease of magnetization or demagnetization of a magnetic material depends on the crystal structure, grain orientation, the state of strain, and the direction of the magnetic field. The magnetization is most easily obtained along the easy axis of magnetization but most difficult along the hard axis of magnetization. A magnetic material is said to posses a magnetic anisotropy when easy and hard axes exist. On the other hand, a magnetic material is said to be isotropic when there are no easy or hard axes. A magnetic material is said to possess a uniaxial anisotropy when the easy axis is oriented along a single crystallographic direction, and to possess multiaxial anisotropy when the easy axis aligns with multiple crystallographic directions.

"Anisotropy energy" is the work against the anisotropy force to turn magnetization vector away from an easy direction. For example, a single crystal of iron, which is made up of a cubic array of iron atoms, tends to magnetize in the directions of the cube edges along which lie the easy axes of magnetization. A single crystal of iron requires about $1.4 \times 10^5$ ergs/cm$^3$ (at room temperature) to move magnetization into the hard axis of magnetization from an easy direction, which is along a cubic body diagonal. Important magnetic properties, such as coercivity ($H_c$), remanent magnetization ($M_r$) and coercive squareness (S*), which are crucial to the recording performance of the Co alloy thin film for a fixed composition, depend primarily on its microstructure. For thin film longitudinal magnetic recording media, the desired crystalline structure of the Co and Co alloys is HCP with uniaxial crystalline anisotropy and a magnetization easy direction along the c-axis is in the plane of the film. Moreover, longitudinal media is often sputtered on textured substrate to further align magnetic easy axis along the textured lines. The better alignments of easy axis in the plane of the film and along texture lines lower noise of the longitudinal recording media. For very small grain sizes coercivity increases with increased grain size. As grain size increases, noise increases. There is a need to achieve stable recording media without the increase in noise associated with large grains. To achieve a low noise magnetic medium, the Co alloy thin film should have uniform small grains with grain boundaries that can magnetically isolate neighboring grain diameters. This kind of microstructure and crystallographic texture is normally achieved by manipulating the deposition process, or most often by the proper use of an underlayer.

Efforts are continually being made to increase the areal recording density, i.e., the bit density, or bits/unit area, and signal-to-medium noise ratio (SMNR) of the magnetic media. To continue pushing areal densities and increase overall storage capacity, the data bits must be made smaller and put closer together by making the magnetic grains storing data bits smaller. However, as the grains become small, there are two problems.

First, the magnetic energy holding the grain in place may become so small that thermal energy may cause it to demagnetize over time. This phenomenon is known as superparamagnetism. To avoid superparamagnetic effects, one has to increase anisotropy of the material used in the media, but the available writing fields limit the anisotropy increase.

In conventional magnetic recording media CoCr alloys are deposited on pre-heated substrate to increase mobility of the atoms landing on the substrate and therefore improve segregation of Cr-rich phase in grain boundary. Moreover, pre-heating of substrate is also required to establish Cr(200)/Co (11-20) texture required for traditionally used longitudinal recording media. In particular, for the conventional CoCr-based metallic magnetic films, it is essential to increase the temperature of the substrate to 200° C. or higher during film formation in order to diffuse Cr in grain boundary. Furthermore, to increase the recording density and reduce the noise of a magnetic recording medium, an inter-grain magnetic interaction should be weakened by facilitating segregation in the magnetic layer, and a crystal orientation of the CoCr-based ferromagnetic crystal grains should be controlled. Specifically, the c-axis of the hexagonal close-packed ferromagnetic crystal grains of longitudinal media should be oriented in a film surface. For this purpose, in a case of the prior art metallic magnetic layers, the crystal orientation of the magnetic layer is realized by controlling a structure and crystal orientation of the nonmagnetic base layer.

For further improvement of the magnetic properties and reduction of noise, this invention proposes a novel process for fabricating a novel longitudinal granular oxide media. Granular oxide media of this invention have sharper transitions between non-magnetic (grain boundary) and magnetic (magnetic grains) regions than diffusion-segregated media that is grown at elevated temperatures. For this reason magnetic grains in granular media have higher magnetic saturation, $M_s$, anisotropy and narrower switching field distribution, while maintaining low inter-granular exchange coupling.

SUMMARY OF THE INVENTION

This invention preferably relates a longitudinal magnetic recording medium comprising a substrate.

Additional advantages of this invention will become readily apparent to those skilled in this art from the following detailed description, wherein only the preferred embodiments of this invention is shown and described, simply by way of illustration of the best mode contemplated for carrying out this invention. As will be realized, this invention a property of other and different embodiments, and its details are capable of modifications in various obvious respects, all without departing from this invention. Accordingly, the drawings and description are to be regarded as illustrative in nature and not as restrictive.

DETAILED DESCRIPTION

One way to result in an improvement in the signal to noise ratio (SNR) or signal to media noise ratio (SMNR) of longitudinal magnetic recording media (for further increasing the recording density) is by decreasing the average grain volume, V. The attainable SNR increases as $\sim N^{1/2}$ with the number of grains, N, per recorded transition as well as with decreasing $M_rt$ of the recording media. $M_rt$ is the product of the remanent magnetization, $M_r$, and the film thickness, t, of the magnetic material. Both ways to increase SNR lead to a smaller energy barrier, $K_uV$, which resists magnetization reversal due to thermal agitation. The volume reduction can be partially offset by increasing the anisotropy of the material used in the media, but the available writing fields limit the anisotropy increase.

Figure 1:
FIG. 1 shows benefits of granular longitudinal oxide media in comparison to alloy media namely:
1) Reduced head media separation due to the higher Ms of granular longitudinal oxide media (GLOM). Note Mrt of both GLOM and alloy media was kept constant.
2) Improved switching field distribution due to sharper magnetic and non-magnetic transition at the grain boundary region. Note $\sigma_{H_A}$ is distribution of anisotropy field and $H_A$ is anisotropy field.
Figure 1:
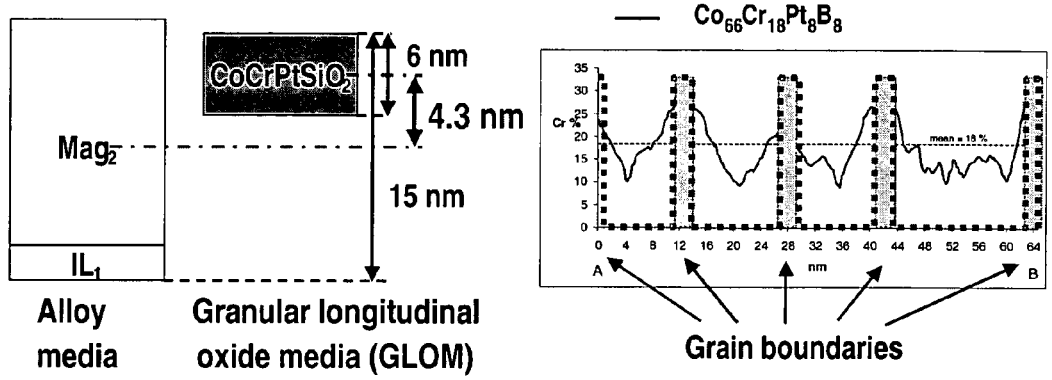

In other to increase density of recorded information on magnetic media both media and electronic noise have to be reduced. Electronic noise is very sensitive to the signal voltage produced by the magnetic media and that is proportional to $M_rt$. Thus further reducing $M_rt$ is restricted due to increase of electronic noise. For example, in the case of a particulate media, magnetic media contains a large amount of Cr in order to achieve required reduction in direct exchange coupling between magnetic grains. A presence of Cr in Co rich magnetic layer severely reduces saturation magnetization, $M_s$, and the magnetocrystalline anisotropy, $H_A$, of magnetic grains. Moreover, the Cr distribution across the interface between non-magnetic, grain boundaries, and magnetic, magnetic grains (FIG. 1 example $CO_{66}Cr_{18}Pt_8B_8$), is broad and non-uniform. Hence, such a media requires a large film thickness of the magnetic layer to produce a required $M_rt$. Also, non-uniform Cr distribution in Co reach magnetic layers increase the distribution of the $H_A$ of magnetic grains. This leads to increase in switching field distribution (SFD) of magnetic grains. On the other hand, a film with sharp transition across the interface between non-magnetic, grain boundaries, and Co magnetic grains, it is expected to have several times high $M_s$ and much narrower distribution of $H_A$ of magnetic grains with the same reduction in direct exchange coupling between magnetic grains as in Co magnetic layers with addition of Cr. Such a media would require a several times thinner magnetic layer than CoCr media to produce a required $M_rt$ leading to reduced head media separation. It is also expected narrower switching field distribution of magnetic grains. The microstructure with the sharper transition across the interface between non-magnetic, grain boundaries, and Co magnetic grains, can be achieved in oxide granular media, Co+oxide where possible oxides include $SiO_2$, $Al_2O_3$ and $TiO_2$.

Media with Co(11.0) preferred orientations have narrower in-plane c-axis dispersion than that of the media with Co(10.0) preferred orientations. Oriented magnetic media having Cr-containing underlayers with cubic (200) crystallographic orientations and Co(11.0) crystallographic orientations have better recording performances than isotropic media having Co(10.0) crystallographic orientations. Oriented magnetic media with Mrt orientation ratio (OR-Mrt) of about 1.5 have about 2.5 dB higher media signal-to-noise ratio (SMNR) tested at 500 kfci (thousand flux reversals per inch) than isotropic media, which have OR-Mrt of 1. Mrt orientation ratio stands for the ratio of Mrt along the circumferential direction over Mrt along the radial direction. Mrt stands for product of remanent magnetization and magnetic film thickness. The Mrt orientation ratio of more than 1.05 is caused by the combination of circumferential mechanical texturing/grooving of the substrate and the Co(11.0) crystallographic orientation. Oriented media are the media with OR-Mrt more than 1, e.g. more than 1.05. Deeper grooves usually induce higher orientation ratio, but also increase film roughness and higher flight height of the magnetic heads will not be avoided. High flight height is not desirable.

This invention utilizes a novel process to produce a novel granular magnetic layer media, also referred to as a "granular oxide media" because the granular magnetic layer comprises magnetic crystal grains that are substantially isolated by an inter-granular region comprising a non-magnetic substance, which is preferably an oxide-containing material. Granular oxide media is grown on a substrate that is not heated in a presence of high pressure inert gas. Thus, adatom mobility is reduced helping the formation of inter-granular physical separation that can be filled with oxide-containing material. However, low temperature of a substrate may not be optimal for obtaining magnetic films with Co(11-20) texture. For this reason in this invention, granular longitudinal oxide media is formed using a two step process. In the first part of the process substrate is pre-heated to establish Cr(200)/Co(11-20) texture. In the second part of the process substrate is cooled to help formation of inter-granular separation filled by oxide-containing material. In general, oxide media is grown in a gas mixture of inert gas and oxygen atmosphere. Preferably, the oxygen content is limited to less than 20% or even more preferably below 2-5%, see FIG. 6, by volume of the inert gas in the gas mixture because additional oxygen could be detrimental to the formation of Co(11-20) texture. While the exact mechanism for the improvements observed by the media of this invention is not well understood, arguably, the improved performance of the media of this invention could be due to microstructure changes resulting from the novel process conditions for forming the media with a granular magnetic layer.

When referring to magnetic recording media, there are two basic types: oriented and isotropic. Isotropic media has the magnetic layer and under-layers, which are used to control the crystallographic orientation of the magnetic layer, applied to a non-preferentially polished substrate. Oriented media has a scratch pattern or texture on the disc surface. The texture improves magnetic orientation and enhances film performance by initiating grain growth. Also, the texture causes magnetic properties in down-track and cross-track directions to be different, which could greatly increase media signal-to-noise ratio, thereby greatly improving media performance and density. The substrate could be a glass substrate or aluminum substrate, preferably with a nickel phosphorus NiP or cobalt tungsten CoW seedlayer coating. To texture the surface of a Al substrate, seedlayer materials such as NiP layer is applied, which is then textured. Glass substrate is can be textured first and then seedlayer, NiP or CoW, is deposited using Ar or Ar+$O_2$ sputtering gas. Recording media of this invention could be oriented or isotropic, though oriented media using textured substrate is preferred.

Figure 2:
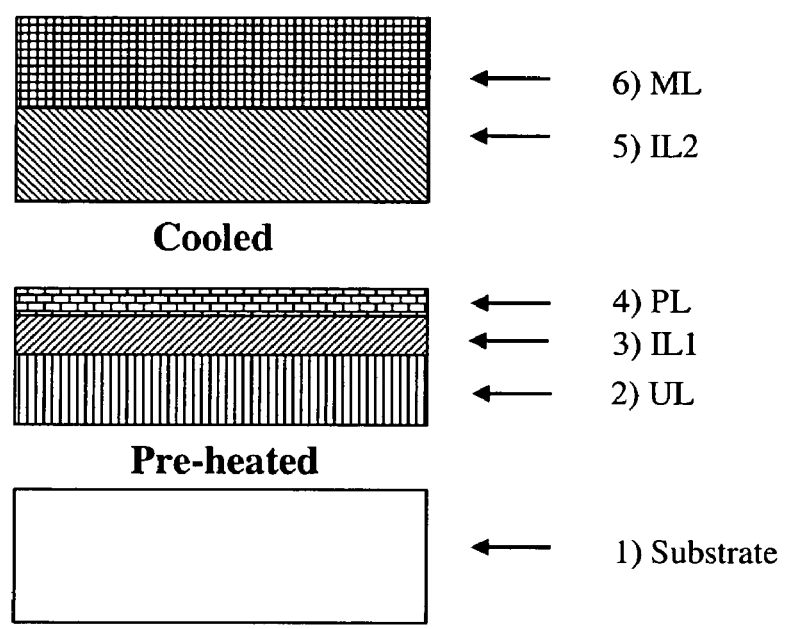
FIG. 2 shows film structure with 1) substrate, 2) underlayer (UL), 3) first interlayer (IL1), 4) protective layer (PL), 5) second underlayer (UL2), 6) granular magnetic layer (ML) and 7) protective carbon layer.

FIG. 2 shows a simplified cross-sectional view of an embodiment of this invention. The film structure of the magnetic media and the desired steps for formation of the structure could include the following layers:

1) Substrate, Al, Al-alloy, glass or plastic, which could optionally have a non-oxidized or oxidized seedlayer.

Step 1: Pre-heat the substrate to a temperature $T_1$ that is substantially higher than room temperature to increase the mobility of the atoms landing on the substrate.

2) Non-magnetic seed and under layers, UL, capable of controlling the crystallographic texture of Co-based alloys. Seedlayers may be composed of amorphous or fine grain material such as NiAl, CrTi. Underlayers may be Cr-based alloys.

Step 2: Substrate cooled to a temperature $T_2$, wherein $T_2 < T_1$. Optionally, this cooling step could be performed after depositing the protective layer, PL, described below.

3) First interlayer, IL1, that consists of an alloy material selected from the group consisting of Co; with one or more added elements selected from Cr, Pt, Ta, B, W, Mo, Ru, Si, Cu, Ag, Ge, Nb, Fe and Ni.

4) Protective layer, PL, may or may not be present. Examples: Ru and Ru alloys.

5) Second interlayer, IL2, having hexagonal crystal structure. May consist of:

(a) Co or Co alloyed with one or more elements selected from Cr, Pt, Ta, B, W, Mo, Ru, Si, Cu, Ag, Ge, Nb, Fe and Ni, or (b) Ru or Ru alloyed with one or more elements selected from Rh, Ir, Cr, Re, V, W, Ta, Zr, Hf, Ti and Mo.

6) A main ferromagnetic layer/s, ML, that may consist of Co with one or more added elements selected from Cr, Pt, Ta, B, Fe, Cu, Ag, W, Mo, Ru, Si, Ge, Nb, and Ni. This layer also consists of at least one oxide-containing material selected from group consisting of Si, Al, Ti, Hf, Zr, Y, Cr, Co, Ni and Ta oxides. Example: CoCrPt+$SiO_2$. In a preferred embodiment, Co—Cr—Pt—$SiO_2$ comprises at least 0-15 atomic percent Cr, 0 to 35 atomic percent Pt, 0.01 to 15 atomic percent $SiO_2$, and Co in the balance.

7) Protective layer: Carbon layer.

Instead, of a NiP seedlayer, the layer on the substrate could be any Ni-containing seedlayer such as a NiNb seedlayer, a Cr/NiNb seedlayer, or any other Ni-containing seedlayer. Optionally, there could be an adhesion layer between the substrate and the seedlayer. The surface of the Ni-containing seedlayer could be optionally oxidized.

In a preferred embodiment, the thickness of the seedlayer is about 10 Å to about 10000 Å, the thickness of the underlayer is about 5 Å to about 1000 Å, and the thickness of the magnetic layer is about 30 Å to about 300 Å. In another preferred embodiment, the thickness of the adhesion layer is about 3 Å to about 1000 Å, the thickness of the seedlayer is about 10 Å to about 2000 Å, the thickness of the underlayer is about 5 Å to about 1000 Å, and the thickness of the magnetic layer is about 30 Å to about 300 Å.

In a preferred embodiment, the thickness of the adhesion layer, if present, is monolayer to about 250 Å, preferably between 5 Å and 150 Å, and most preferably about 10 to 30 Å. In a preferred embodiment, the thickness of the seedlayer is 10 Å to about 10000 Å, preferably between 20 Å and 1200 Å. In a preferred embodiment, the thickness of the underlayer is 5 Å to about 500 Å, preferably between 15 Å and 250 Å, and most preferably about 40 to 100 Å. In a preferred embodiment, the thickness of the first and second interlayers is one monolayer to about 1000 Å, preferably between 5 Å and 300 Å, and most preferably from 10 Å to 200 Å. In a preferred embodiment, the thickness of the magnetic layer is 30 Å to about 250 Å, preferably between 40 Å and 120 Å, and most preferably between 50 Å and 90 Å. In a preferred embodiment, the thickness of the protective layer is 10 Å to about 300 Å, preferably between 20 Å and 60 Å, and most preferably about 30 Å. The protective layer is made of hydrogenated carbon ($CH_1$).

The magnetic recording medium has a remanent coercivity of about 2000 to about 10,000 Oersted, and an $M_r t$ (product of remanance, Mr, and magnetic layer thickness, t) of about 0.15 to about 2.0 memu/$cm^2$. In a preferred embodiment, the coercivity is about 2500 to about 9000 Oersted, more preferably in the range of about 3000 to about 6000 Oersted, and most preferably in the range of about 3500 to about 5500 Oersted. In a preferred embodiment, the $M_r t$ is about 0.15 to about 1 memu/$cm^2$, more preferably in the range of about 0.20 to about 0.45 memu/$cm^2$, and most preferably in the range of about 0.25 to about 0.4 memu/$cm^2$.

Almost all the manufacturing of a disk media takes place in clean rooms where the amount of dust in the atmosphere is kept very low, and is strictly controlled and monitored. After one or more cleaning and texturing processes on a non-magnetic substrate, the substrate has an ultra-clean surface and is ready for the deposition of layers of magnetic media on the substrate.

Each of the layers constituting magnetic recording media of the present invention, except for a lubricant topcoat layer (if applied), may be deposited or otherwise formed by any suitable physical vapor deposition technique (PVD), e.g., sputtering, or by a combination of PVD techniques, i.e., sputtering, vacuum evaporation, etc., with sputtering being preferred. The lubricant layer is typically provided as a topcoat by dipping the medium into a bath containing a solution of the lubricant compound, followed by removal of excess liquid, as by wiping, or by a vapor lube deposition method.

Sputtering is perhaps the most important step in the whole process of creating recording media. There are two types of sputtering: pass-by sputtering and static sputtering. In pass-by sputtering, disks are passed inside a vacuum chamber, where they are bombarded with the magnetic and non-magnetic materials that are deposited as one or more layers on the substrate. Static sputtering uses smaller machines, and each disk is picked up and sputtered individually.

The sputtering layers are deposited in what are called bombs, which are loaded onto the sputtering machine. The bombs are vacuum chambers with targets on either side. The substrate is lifted into the bomb and is bombarded with the sputtered material.

An pass-by sputtering apparatus for manufacturing magnetic recording media in accordance with the embodiments of the present invention is could comprise an in-line deposition system in which disk substrates travel sequentially through the deposition stations. The disks pass through stations for underlayer deposition, fist interlayer deposition, protective layer deposition, second interlayer deposition and magnetic layer deposition. The disks are then passed to the protective carbon overcoat deposition station. Other embodiments would require variations to the in-line process using well-known processing techniques or structures that are not described herein.

Sputtering leads to some particulates formation on the post sputter disks. These particulates need to be removed to ensure that they do not lead to the scratching between the head and substrate. Thus, a lube is preferably applied to the substrate surface as one of the topcoat layers on the substrate.

Once a lube is applied, the substrates move to the buffing/burnishing stage, where the substrate is polished while it preferentially spins around a spindle. After buffing/burnishing, the substrate is wiped and a clean lube is evenly applied on the surface.

Subsequently, the disk could be prepared and tested for quality thorough a three-stage process. First, a burnishing head passes over the surface, removing any bumps (asperities as the technical term goes). The glide head then goes over the disk, checking for remaining bumps, if any. Finally the certifying head checks the surface for manufacturing defects and also measures the magnetic recording ability of the substrate.

EXAMPLES

Longitudinal media having granular magnetic layer with the following structures were prepared:

Structure 1: Al substrate/NiP/Heated/Cr-rich UL [~80 Å]/CoCr-rich $IL_1$ [~30 Å]/Cooled/Ru-rich $IL_2$ [~200 Å]/CoCrPt +$SiO_2$ ML [~80 Å] (sputtered in Ar atmosphere).

Structure 2: Al substrate/NiP/Heated/Cr-rich UL [80 Å]/CoCr-rich $IL_1$ [30 Å]/Ru-rich $IL_2$[~200 Å] (sputtered in Ar atmosphere), Structure 3: Al substrate/NiP/Heated/Cr-rich UL [~80 Å]/CoCr-rich $IL_1$ [30 Å]/Cooled/Ru-rich $IL_2$ [~200 Å] (all sputtered in Ar atmosphere)/CoCrPt +$SiO_2$ ML [~80 Å] (sputtered in Ar+$O_2$ atmosphere).

For media structure 1, Al substrate was heated to about 473 K (200° C.) and subsequently UL and $IL_1$ were deposited in 5 mTorr Ar atmosphere. Al substrate was then cooled for about 5 minutes below 400 K to mimic the sputtering conditions required for sputtering granular oxide media. $IL_2$ and ML were then deposited in 30 mTorr and 40 mTorr of Ar atmosphere, respectively. X-ray data of FIG. 2 show three diffraction peaks of structure 1 that belong to Cr-rich bcc (body center cubic) UL structure with [200] orientation, Ru-rich hcp (hexagonal close pack) $IL_2$ structure with [11-20] orientation and Co-rich hcp (hexagonal close pack) $IL_1$+ML structure with [11-20] orientation. It follows from table that both $IL_2$ and ML grow in the same the direction [11-20] direction.

For media structure 2, Al substrate was heated to about 473 K (200° C.) and subsequently UL, $IL_1$ and $IL_2$ were deposited in 5 mTorr Ar atmosphere.

The full-width-at half-maximum, FWHM, of [11-20] rocking curves of $IL2$ and ML in media structures 1 and 2 were measured and are shown Table 1. FWHM of [11-20] rocking curve shows the degree of orientation of [11-20] direction around the direction normal to the film plane. If the FWHM of [11-20] rocking curve is narrower [11-20] orientation is better aligned along the direction normal to the film plane. Results show that FWHM of $IL2$ does not change if Al substrate is cooled for 5 min., i.e., for both media structures 1 and 2, FWHM of $IL2$ is about 5 degrees.

TABLE 1

|  | Media 1) | Media 2) | Media 3) |
| --- | --- | --- | --- |
| FWHM(IL1) [degree] | IL1~1.5 nm | 4.7 | IL1~1.5 nm |
| FWHM(IL2) [degree] | 4.9 | 5.2 | 4.9 |
| FWHM(ML) [degree] | 5.2 |  | [11-20] not visible |

Figure 3:
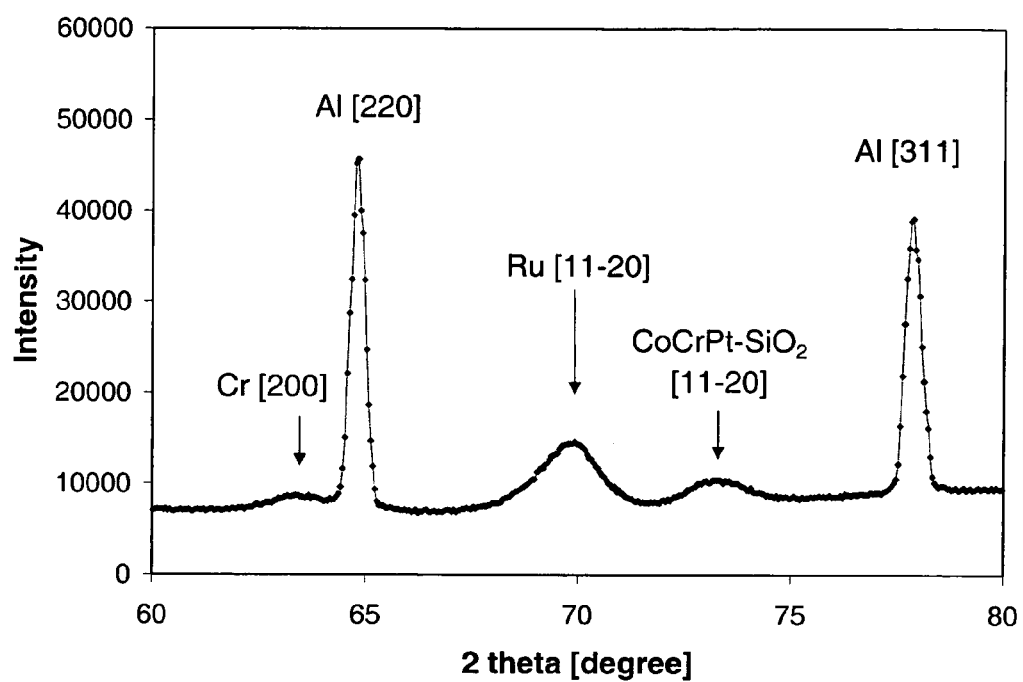
FIG. 3 shows X-ray data showing that direction of growth of UL is [200] and both IL2 and ML are [11-20]. Note that "[11-20]" refers to "one, one, two bar, zero" where "two bar" is numeral "2" with a bar above it. The media structure is: Al substrate with NiP seed layer/UL/IL1/IL2/ML/carbon protective layer.

Moreover, FWHM of ML is the same as that of $IL2$ as shown in FIG. 3. Thus, presence of oxide does not interrupt the crystal growth. It follows that the two-step process represents valuable process for producing well-oriented longitudinal magnetic oxide layers.

For media structure 3, ML was deposited in a presence of 40 mTorr of mixture Ar and $O_2$ atmosphere (for example in FIG. 3, 32/4 means 32 sccm of Ar and 4 sccm of gas that consists of 8 parts by volume of Ar and for 1 part by volume of $O_2$).

Table 2 shows full width at half maximum [FWHM] of rocking curves of Cr-rich UL, Ru-rich $IL2$ and ML in media structure 1.

TABLE 2

| Layer | Structure | Direction | FWHM of RC [degree] |
| --- | --- | --- | --- |
| Cr-rich UL | bcc | [200] | 6.2 |
| Ru-rich IL | hcp | [11-20] | 4.9 |
| CoCrPt—$SiO_2$ | hcp | [11-20] | 5.2 |

RC - rocking curve

Figure 4:
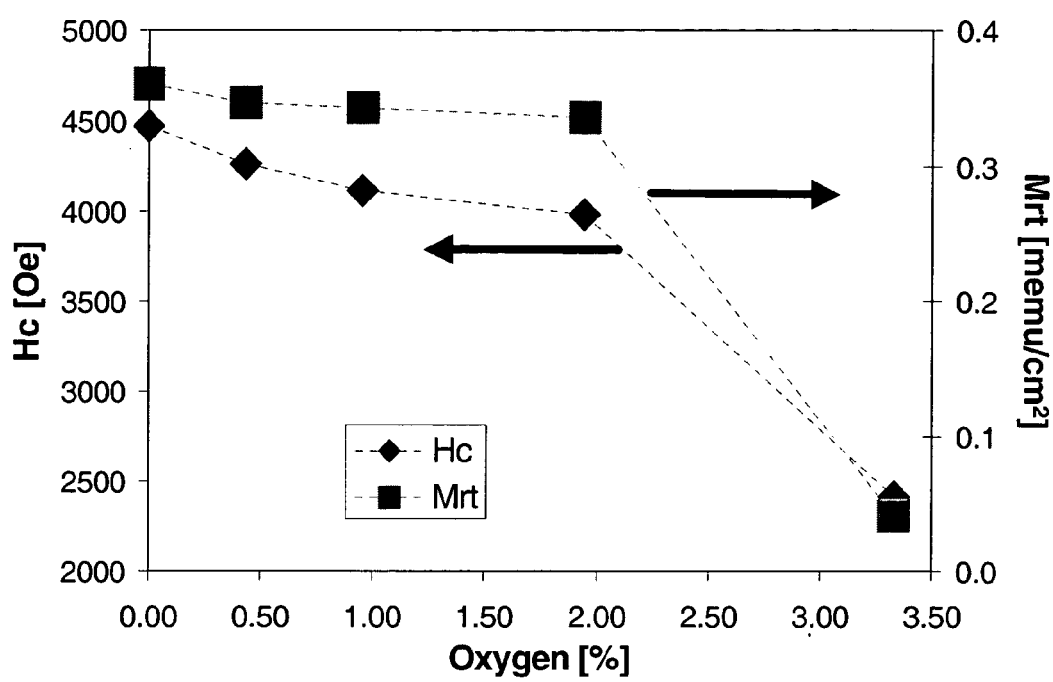
FIG. 4 shows how the oxygen content affects $M_rt$ and $H_c$ of longitudinal granular media. Media was sputtered in mixture of argon an oxygen atmosphere. Figure shows that performance of granular longitudinal oxide media deteriorates for oxygen content larger than 2%. Media structure: Glass substrate/Seed layer/Heat/UL/IL$_1$/IL$_2$/ML/carbon overcoat.

FIG. 4 shows how the oxygen content affects $M_rt$ and $H_r$ of longitudinal granular media. Media structure 3 was sputtered in mixture of argon an oxygen atmosphere. Figure shows that performance of granular longitudinal oxide media deteriorates for oxygen content larger than 2%.

Structure 4: We used minimum heat required to obtain (200) growth of UL. Media structure same as structure 3: Temperature of a disk with cooling below 150° C. (423 K) during deposition of Ru-rich $IL_2$/CoCrPt +$SiO_2$ ML/carbon overcoat. Al substrate/NiP/Heated/Cr-rich UL [~80 Å]/CoCr-rich $IL_1$ [~30 Å]/Ru-rich $IL_2$ [~200 Å] (all sputtered in Ar atmosphere)/CoCrPt+$SiO_2$ ML [80 Å] (sputtered in Ar+$O_2$ atmosphere).

Cr-rich UL structure: Cr/CrMoTa or Cr/CrMoB/CrMoTa

CoCr-rich $IL_1$ structure: CoCrTa or CoCrTa/CoCrPtB.

The performance of structure 4 was not as good as that of Structure 3 but was not lacking significantly.

This application discloses several numerical ranges in the text and figures. The numerical ranges disclosed inherently support any range or value within the disclosed numerical ranges even though a precise range limitation is not stated verbatim in the specification because this invention can be practiced throughout the disclosed numerical ranges.

The above description is presented to enable a person skilled in the art to make and use the invention, and is provided in the context of a particular application and its requirements. Various modifications to the preferred embodiments will be readily apparent to those skilled in the art, and the generic principles defined herein may be applied to other embodiments and applications without departing from the spirit and scope of the invention. Thus, this invention is not intended to be limited to the embodiments shown, but is to be accorded the widest scope consistent with the principles and features disclosed herein. Finally, the entire disclosure of the patents and publications referred in this application are hereby incorporated herein by reference.

The invention claimed is:

1. A longitudinal granular oxide recording medium, comprising:
    (a) at least one non-magnetic layer with body-centered cubic atomic structure with a (200) preferred growth orientation,
    (b) at least one interlayer with hexagonal close packed atomic structure and with a <11-20> preferred growth orientation,
    (c) at least one magnetic oxide-containing granular magnetic layer with hexagonal close packed atomic structure and with a <11-20> preferred growth orientation
    wherein the interlayer comprises at least two layers: a first interlayer, $IL_1$, located above first layer (a) and comprising a Co—X alloy, wherein X is selected from the group consisting of Cr, Pt, Ta, B, W, Mo, Ru, Si, Cu, Ag, Ge, Nb, Fe, Ni, Au and combinations thereof, and a second interlayer, $IL_2$, comprising a Ru—Y alloy, wherein Y is selected from the group consisting of Rh, Ir, Cr, Re, Co, V, W, Ta, Zr, Hf, Ti, Mo, Au and combinations thereof.

2. The longitudinal granular oxide recording medium of claim 1, wherein the first interlayer comprises at least 50 at. % of Co and the second interlayer comprises at least 50 at. % of Ru.

3. The longitudinal granular oxide recording medium of claim 1, wherein the magnetic oxide-containing granular magnetic layer comprises magnetic crystal grains that are substantially isolated by an inter-granular region comprising a non-magnetic substance.

4. The longitudinal granular oxide recording medium of claim 3, wherein there is substantially no diffusion of the non-magnetic substance from the magnetic crystal grains to the inter-granular region.

5. The longitudinal granular oxide recording medium of claim 1, further comprising a substrate having a textured surface and the magnetic oxide-containing granular magnetic layer has an OR-Mrt of greater than 1.0.

6. The longitudinal granular oxide recording medium of claim 1, wherein a full-width at half-maximum of a rocking curve of the magnetic oxide-containing granular magnetic layer in a [11-20] direction is less than 10°.

7. The longitudinal granular oxide recording medium of claim 1, wherein a full-width at half-maximum of a rocking curve of the magnetic oxide-containing granular magnetic layer in a [11-20] direction is less than 7° and the magnetic oxide-containing granular magnetic layer has an OR-Mrt of greater than 1.4.

* * * * *